United States Patent
Takafuji

(10) Patent No.: US 10,068,362 B2
(45) Date of Patent: Sep. 4, 2018

(54) DATA PROCESSING APPARATUS AND METHOD OF DETECTING POSITION INFORMATION FOR DISPLAYING VIRTUAL SPACE

(71) Applicant: KOEI TECMO GAMES CO., LTD., Kanagawa (JP)

(72) Inventor: Yuishin Takafuji, Kanagawa (JP)

(73) Assignee: KOEI TECMO GAMES CO., LTD., Kanagawa (JP)

(*) Notice: Subject to any disclaimer, the term of this patent is extended or adjusted under 35 U.S.C. 154(b) by 0 days.

(21) Appl. No.: 15/246,981

(22) Filed: Aug. 25, 2016

(65) Prior Publication Data

US 2017/0061668 A1    Mar. 2, 2017

(30) Foreign Application Priority Data

Sep. 2, 2015 (JP) ................................ 2015-173023

(51) Int. Cl.
G06T 13/40 (2011.01)
G06F 3/01 (2006.01)
A63F 13/40 (2014.01)

(52) U.S. Cl.
CPC .............. *G06T 13/40* (2013.01); *A63F 13/40* (2014.09); *G06F 3/011* (2013.01); *G06T 2210/21* (2013.01)

(58) Field of Classification Search
CPC ..... G06T 13/40; G06T 2210/21; G06F 3/011; A63F 13/40
See application file for complete search history.

(56) References Cited

U.S. PATENT DOCUMENTS

| | | | | |
|---|---|---|---|---|
| 6,256,047 B1* | 7/2001 | Isobe | .................... | A63F 13/10 345/158 |
| 8,000,947 B1* | 8/2011 | Qureshi | .................. | G06T 13/20 703/6 |
| 2001/0049300 A1 | 12/2001 | Okamoto et al. | | |
| 2003/0117405 A1* | 6/2003 | Hubrecht | ................ | G06T 17/00 345/543 |
| 2007/0078918 A1* | 4/2007 | Nagasaka | ............... | G06T 17/10 708/200 |
| 2007/0265083 A1* | 11/2007 | Ikebata | ................... | A63F 13/10 463/37 |
| 2012/0019472 A1* | 1/2012 | Tomita | ................... | A63F 13/812 345/173 |
| 2012/0303343 A1* | 11/2012 | Sugiyama | ............. | G06N 3/006 703/6 |

FOREIGN PATENT DOCUMENTS

JP    2001-276420    10/2001

* cited by examiner

*Primary Examiner* — William A Beutel
(74) *Attorney, Agent, or Firm* — IPUSA, PLLC

(57) ABSTRACT

A data processing apparatus includes a motion control unit that controls a movement of a character in a virtual space; a display unit that displays the character and a background, the background including an object; a detection unit that detects contact position information at which the object of the displayed background and a virtual body provided in the virtual space contact; and a specifying unit that specifies characteristic position information regarding a shape of the object of the background in accordance with the detected contact position information.

16 Claims, 10 Drawing Sheets

FIG.2

| VIRTUAL BODY NO. 301 | CONTACT POSITION INFORMATION 302 | EDGE POSITION INFORMATION 303 |
|---|---|---|
| C1 | $(x_1, y_1), (x_2, y_2) \cdots (x_7, y_7)$ | $(x_6, y_6)$ |
| C2 | $(x_8, y_8), (x_9, y_9), (x_{10}, y_{10})$ | $(x_{10}, y_{10})$ |
| C3 | $(x_{11}, y_{11}), (x_{12}, y_{12}) \cdots (x_{16}, y_{16})$ | $(x_{14}, y_{14})$ |
| C4 | $(x_{17}, y_{17}), (x_{18}, y_{18}) \cdots (x_{23}, y_{23})$ | $(x_{20}, y_{20})$ |

| CANDIDATE TARGET NO. 311 | CANDIDATE TARGET POSITION INFORMATION 312 |
|---|---|
| G1 | $(x_{g1}, y_{g1})$ |
| G2 | $(x_{g2}, y_{g2})$ |
| G3 | $(x_{g3}, y_{g3})$ |
| G4 | $(x_{g4}, y_{g4})$ |

31

DATA PROCESSING APPARATUS AND METHOD OF DETECTING POSITION INFORMATION FOR DISPLAYING VIRTUAL SPACE

CROSS-REFERENCE TO RELATED APPLICATION

The present application is based on and claims the benefit of priority of Japanese Priority Application No. 2015-173023 filed on Sep. 2, 2015, the entire contents of which are hereby incorporated by reference.

BACKGROUND OF THE INVENTION

1. Field of the Invention

The present invention relates to a data processing apparatus and a method of detecting position information.

2. Description of the Related Art

A technique is known by which a player character and a background are displayed in a virtual space, and the player character is controlled to perform a predetermined motion in accordance with an operation by a player (see Patent Document 1, for example).

When the player performs an input operation such as rotation, translation or the like for the player character, a calculation process is performed for obtaining how to change the position, the direction or the like of the player character in accordance with the input operation. Next, another calculation process is performed for obtaining how to display objects such as buildings or the like of the background on a screen in accordance with the change of the position, the direction or the like of the player character. Positional information for each of the objects that is previously stored in a storage unit is used for this calculation process.

The above two calculation processes are performed in real time following the operation by the player. With this, the player character that moves between the objects of the background can be displayed on the screen in accordance with the operation by the player.

However, according to the above described technique, it is necessary to previously store the position information of each of the objects of the background, which is troublesome. Furthermore, according to the above described technique, the position information of each of the objects of the background is a fixed value, so that it is difficult to control the player character to appropriately move in the virtual space in accordance with a status of the player character such as a direction of movement of the player character, a relative positional relationship between the objects or the like. In particular, when the object dynamically moves, it is difficult to control the player character to appropriately move in accordance with the positions of the objects in the virtual space.

PATENT DOCUMENT

[Patent Document 1] Japanese Laid-open Patent Publication No. 2001-276420

SUMMARY OF THE INVENTION

The present invention is made in light of the above problems, and provides a technique to control a character to appropriately move in a virtual space.

According to an embodiment, there is provided a data processing apparatus including a motion control unit that controls a movement of a character in a virtual space; a display unit that displays the character and a background, the background including an object; a detection unit that detects contact position information at which the object of the displayed background and a virtual body provided in the virtual space contact; and a specifying unit that specifies characteristic position information regarding a shape of the object of the background in accordance with the detected contact position information.

According to another embodiment, there is provided a method of detecting position information, performed by a computer, including controlling a movement of a character in a virtual space; displaying the character and a background, the background including an object; detecting contact position information at which the object of the displayed background and a virtual body provided in the virtual space contact; and specifying characteristic position information regarding a shape of the object of the background in accordance with the detected contact position information.

BRIEF DESCRIPTION OF THE DRAWINGS

Other objects, features and advantages of the present invention will become more apparent from the following detailed description when read in conjunction with the accompanying drawings.

FIG. 2 is a view illustrating an example of a data structure of a contact position table;

FIG. 3 is a view illustrating an example of a data structure of a candidate target position table;

DETAILED DESCRIPTION OF THE PREFERRED EMBODIMENTS

Figure 1:
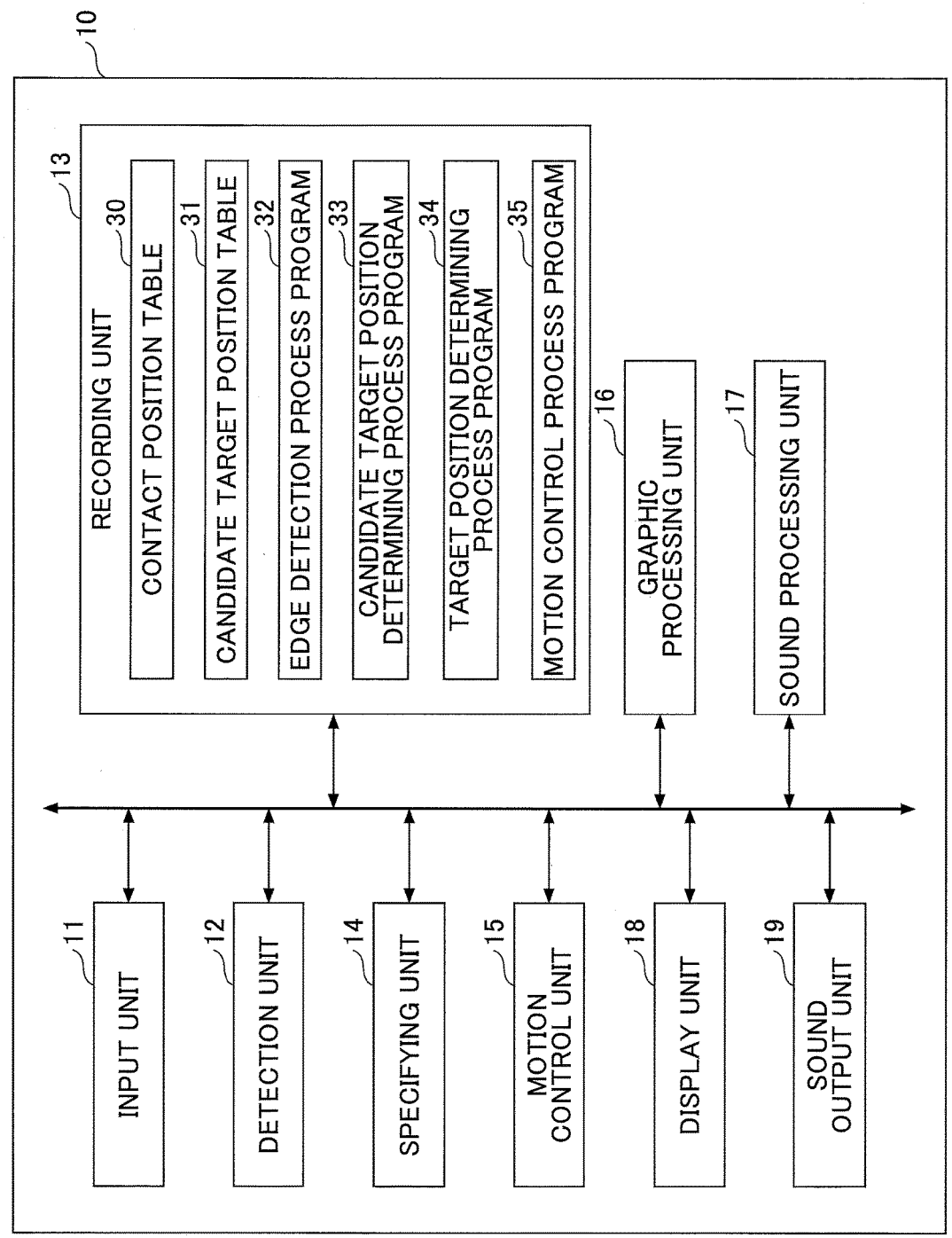
FIG. 1 is a block diagram illustrating an example of a functional structure of a data processing apparatus of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Functional Structure of Data Processing Apparatus)

FIG. 1 is a block diagram illustrating an example of a functional structure of a data processing apparatus 10 of the embodiment. The data processing apparatus 10 may be an electronic device such as a personal computer, a tablet terminal, a game device, a smartphone or the like.

The data processing apparatus 10 includes an input unit 11, a detection unit 12, a recording unit 13, a specifying unit 14, a motion control unit 15, a graphic processing unit 16, a sound processing unit 17, a display unit 18 and a sound output unit 19.

The input unit 11 accepts input information from an input device such as a controller or the like. The detection unit 12 detects contact position information at which an object such as a building, a tree or the like of a background displayed on the display unit 18 and a virtual body provided in a virtual space contact. The detection unit 12 causes the virtual body to bound and detects the contact position information at which the virtual body contacts the object. Here, "the virtual body is caused to bound" means that the virtual body is caused to repeat a step of being moved to contact the object, leap against the object, move along the leaped orbit, and then contact the object.

The recording unit 13 stores data items of each of a contact position table 30 and a candidate target position table 31.

FIG. 2 is a view illustrating an example of a data structure of the contact position table 30. The contact position table 30 includes data items such as a virtual body number 301, contact position information 302 and edge position information 303 detected by the detection unit 12.

The contact position information 302 indicate coordinates, respectively. At each of the coordinates, a virtual body contacts the respective object of the background while the virtual body is caused to bound against the respective object.

The edge position information 303 is one of the contact position information 302, selected from among the contact position information 302, having the coordinate nearest to a position of an edge of the respective object (a side portion of a ceiling portion of a building, a corner portion of a roof of a building, or a front end portion of a tree, for example).

Here, in this embodiment, there are four virtual bodies C1 to C4, and the contact position information 302 and the edge position information 303 of each of the virtual bodies C1 to C4 are stored in the contact position table 30. The number of the virtual bodies is not limited so, and the number of the virtual bodies may be one, or two or more, for example. The bounding times (contacting times) of the virtual body may be once a frame, in other words, about 30 to 60 times per second, or other numbers. Hereinafter, the virtual bodies C1 to C4 may be simply referred to as a virtual body C as well.

The virtual body C is controlled to perform a predetermined motion when measuring the contact positions of the object using the virtual body C. The predetermined motion includes causing the virtual body C to bound, causing the virtual body C to slide, causing the virtual body C to oscillate or the like.

FIG. 3 is a view illustrating an example of a data structure of the candidate target position table 31. The candidate target position table 31 includes data items such as a candidate target number 311 and candidate target position information 312. In this embodiment, candidate target positions of candidate target numbers G1 to G4, the same number as the number of the virtual bodies C1 to C4, are set in the candidate target position table 31. However, the number of the candidate target positions is not limited so, and the number of the candidate target positions may be one, or two or more, for example.

Referring back to FIG. 1, the recording unit 13 further stores various data and various programs. The various programs include an edge detection process program 32, a candidate target position determining process program 33, a target position determining process program 34 and a motion control process program 35. These programs are performed by the data processing apparatus 10 while a player plays a predetermined game.

The specifying unit 14 specifies edge position information of the object of the background in accordance with the contact position information detected by the detection unit 12. The edge position information specified here is an example of characteristic position information regarding a shape of the object of the background displayed in the screen. In this embodiment, the edge position information of the object is selected from among contact position information at each of which the virtual body contacts the object at an upper portion of the object when causing the virtual body to bound. As an example of the specified edge position information, among the contact position information, the contact position information having coordinate nearest to the position of a side portion of a ceiling portion of a building, a corner portion of a roof of a building, a front end portion of a tree, a head portion of a human or the like may be used.

The motion control unit 15 controls motions of the characters in the virtual space. Although the motion control unit 15 mainly controls the motion of the player character PC in this embodiment, the motion control unit 15 may control motions of a non-player character NOP and all objects movable in the virtual space. In this embodiment, the "character" means all objects that are movable such as a tree that bends before the wind or the like, for example, the non-player character NPC and the player character PC.

The graphic processing unit 16 is connected to the display unit 18. When the motion control unit 15 outputs an instruction to display an image, the graphic processing unit 16 outputs a video signal for displaying the image to the display unit 18. With this, the display unit 18 displays the player character PC and the background. 1 frame period of the image included in the video signal output from the graphic processing unit 16 is 1/30 second, for example. The graphic processing unit 16 displays one image at a frame unit (in other words, 1/30 second unit).

The sound processing unit 17 is connected to the sound output unit 19. When the sound processing unit 17 outputs an instruction to output a sound, the sound output unit 19 outputs a sound signal to the speaker 20. With this, the sound corresponding to a status of the player character PC is output.

(Hardware Structure of Data Processing Apparatus)

Figure 4:
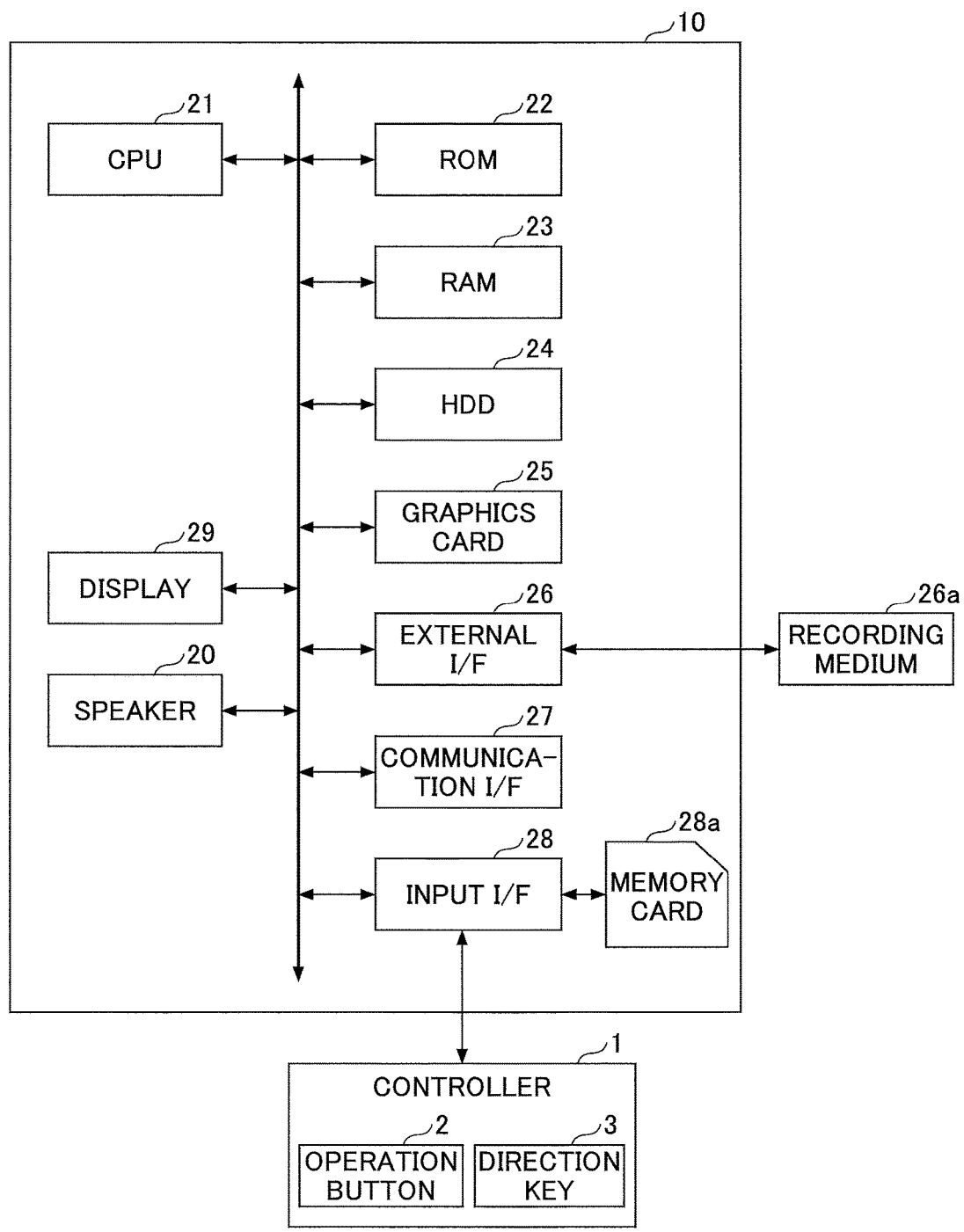
FIG. 4 is a block diagram illustrating an example of a hardware structure of the data processing apparatus of the embodiment.

FIG. 4 is a block diagram illustrating an example of a hardware structure of the data processing apparatus 10 of the embodiment. The data processing apparatus 10 of the embodiment includes a CPU (Central Processing Unit) 21, a ROM (Read Only Memory) 22, a RAM (Random Access Memory) 23 and a HDD (Hard Disk Drive) 24. The data processing apparatus 10 of the embodiment further includes a graphics card 25, an external I/F (interface) 26, a communication I/F 27, an input I/F 28, a display 29 and a speaker 20. The components are connected with each other via a bus.

The ROM 22 is a nonvolatile semiconductor memory capable of storing internal data even when its switch is off.

The ROM 22 stores programs and data. The RAM 23 is a volatile semiconductor memory that temporarily stores programs and data.

The HDD 24 is a nonvolatile storage device that stores programs and data. The programs stored in the HDD 24 include basic software that controls the entirety of the data processing apparatus 10 and application software. The HDD 24 may store various databases. In this embodiment, the HDD 24 stores various programs such as the edge detection process program 32, the candidate target position determining process program 33, the target position determining process program 34, the motion control process program 35 and the like. Further, the HDD 24 stores the contact position table 30 and the candidate target position table 31.

The CPU 21 actualizes the control of the entirety of the data processing apparatus 10 and the functions of the data processing apparatus 10 by reading out the programs and data from the ROM 22 or the HDD 24 on the RAM 23, and executing the various processes. Specifically, the function of the detection unit 12 illustrated in FIG. 1 is actualized by processes executed by the CPU 21 by the edge detection process program 32 installed in the data processing apparatus 10. Further, the function of the specifying unit 14 is actualized by processes executed by the CPU 21 by the candidate target position determining process program 33 and the target position determining process program 34 installed in the data processing apparatus 10. Further, the function of the motion control unit 15 is actualized by processes executed by the CPU 21 by the motion control process program 35 installed in the data processing apparatus 10.

The external I/F 26 is an interface for connecting the data processing apparatus 10 to an external device. The external device may be a recording medium 26a or the like. With this, the data processing apparatus 10 is capable of reading data out from the recording medium 26a and writing data on the recording medium 26a via the external I/F 26. As an example of the recording medium 26a, a CD (Compact Disk), a DVD (Digital Versatile Disk), an SD memory card, a USB memory (Universal Serial Bus memory) or the like may be used.

For example, the data processing apparatus 10 is capable of attaching the recording medium 26a that stores a game program such as the edge detection process program 32, the candidate target position determining process program 33, the target position determining process program 34, the motion control process program 35 and the like. These programs are read out via the external I/F 26 and read by the RAM 23.

The CPU 21 executes the various programs loaded on the RAM 23, and instructs the graphics card 25 to output screens corresponding to the progression of the game. The graphics card 25 performs an image process corresponding to a game scene in accordance with the instruction, and causes the display 29 to display an image of the player character PC and an image of the background. With this, the functions of the graphic processing unit 16 and the display unit 18 are actualized.

1 frame period of the image output from the graphics card 25 is 1/30 to 1/60 second, for example. The graphics card 25 displays one image at a frame unit. This means that 30 to 60 frame images are displayed every second.

The CPU 21 executes the various programs loaded on the RAM 23, and causes the speaker 20 to output a predetermined sound corresponding to the progression of the game. With this, the functions of the sound processing unit 17 and the sound output unit 19 are actualized.

The display 29 may be a touch panel. With this, the input operation can be performed without using the controller 1. In such a case, input information of touched positions detected by the touch panel are stored in the RAM 23. Then, the CPU 21 executes various calculation processes based on the input information stored in the RAM 23.

The communication I/F 27 is an interface for connecting the data processing apparatus 10 to a network. The communication I/F 27 may have a function to have radio communication with another game device via a communication unit including an antenna.

The input I/F 28 is an interface to connect to the controller 1. The controller 1 includes an operation button 2 and a direction key 3. The player can control the player character PC to perform a predetermined motion by operating the operation button 2. Further, the player can move the player character PC in a predetermined direction by operating the direction key 3. The input I/F 28 stores input information based on the input operation performed by the player using the controller 1 in the RAM 23. With this, the function of the input unit 11 is actualized.

The CPU 21 executes various calculation processes such as the motion of the player character PC or the like based on the input information stored in the RAM 23. The input I/F 28 stores data indicating the progression status of the game stored in the RAM 23 in the memory card 28a in accordance with an instruction by the CPU 21, and read out data of the game that is temporarily interrupted stored in the memory card 28a to transfer it to the RAM 23.

(Edge Detection Process)

Figure 5:
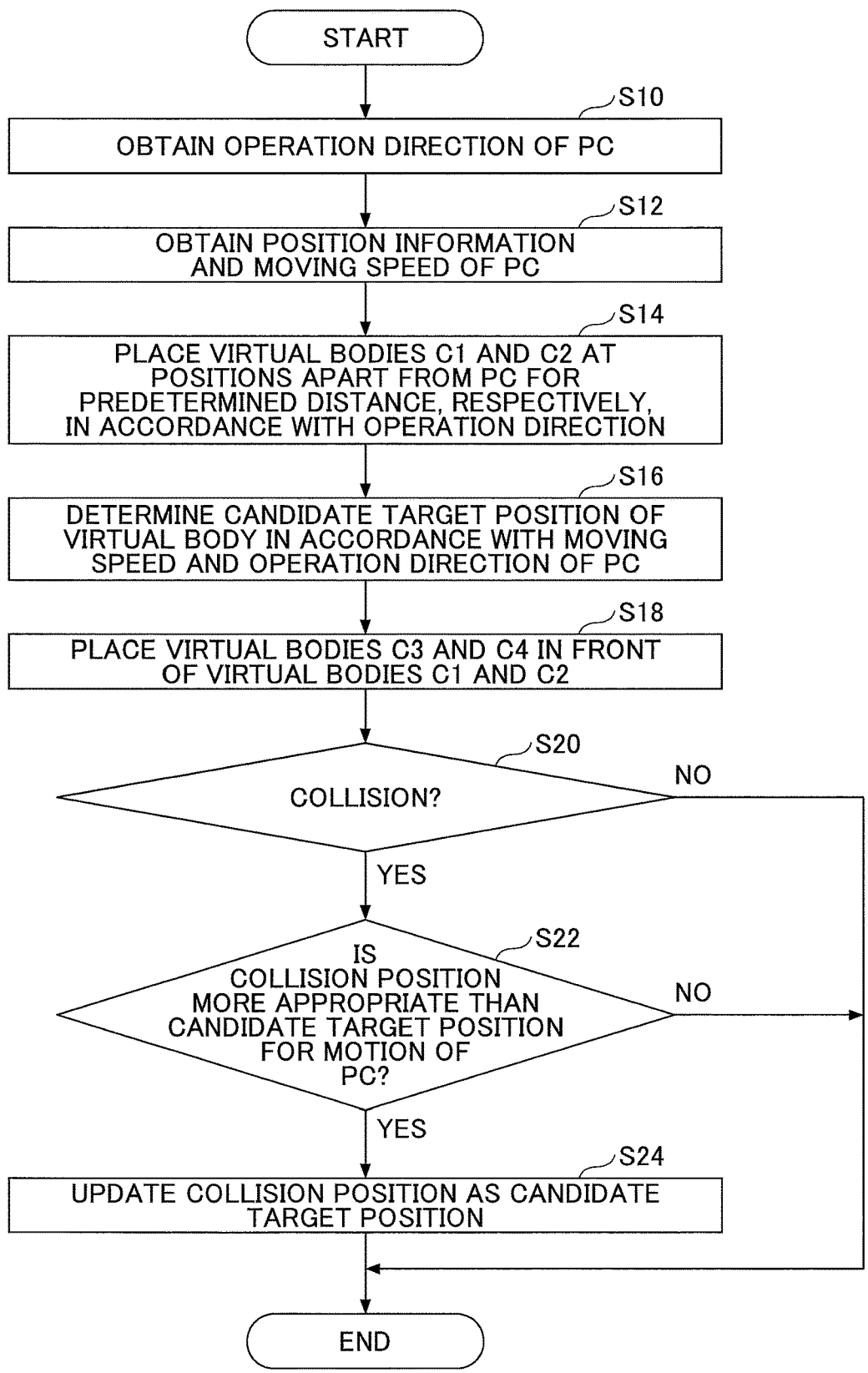
FIG. 5 is a flowchart illustrating an example of a collision process of the embodiment.

Next, an example of a collision process of the embodiment is described with reference to FIG. 5. FIG. 5 is a flowchart illustrating an example of the collision process of the embodiment.

When the process is started, the detection unit 12 obtains an operation direction of the player character PC at the moment from the input unit 11 (step S10). Specifically, the detection unit 12 obtains the operation direction of the player character PC at the moment from input information based on the input operation of the direction key (a cursor key, an arrow key) 3 performed by the player using the controller 1.

Next, the detection unit 12 obtains position information and moving speed of the player character PC at the moment (step S12). Next, the detection unit 12 places (provides) virtual bodies C1 and C2 at positions each of which is apart from the player character PC for a predetermined distance in accordance with the operation direction based on the obtained information (step S14).

Figure 6:
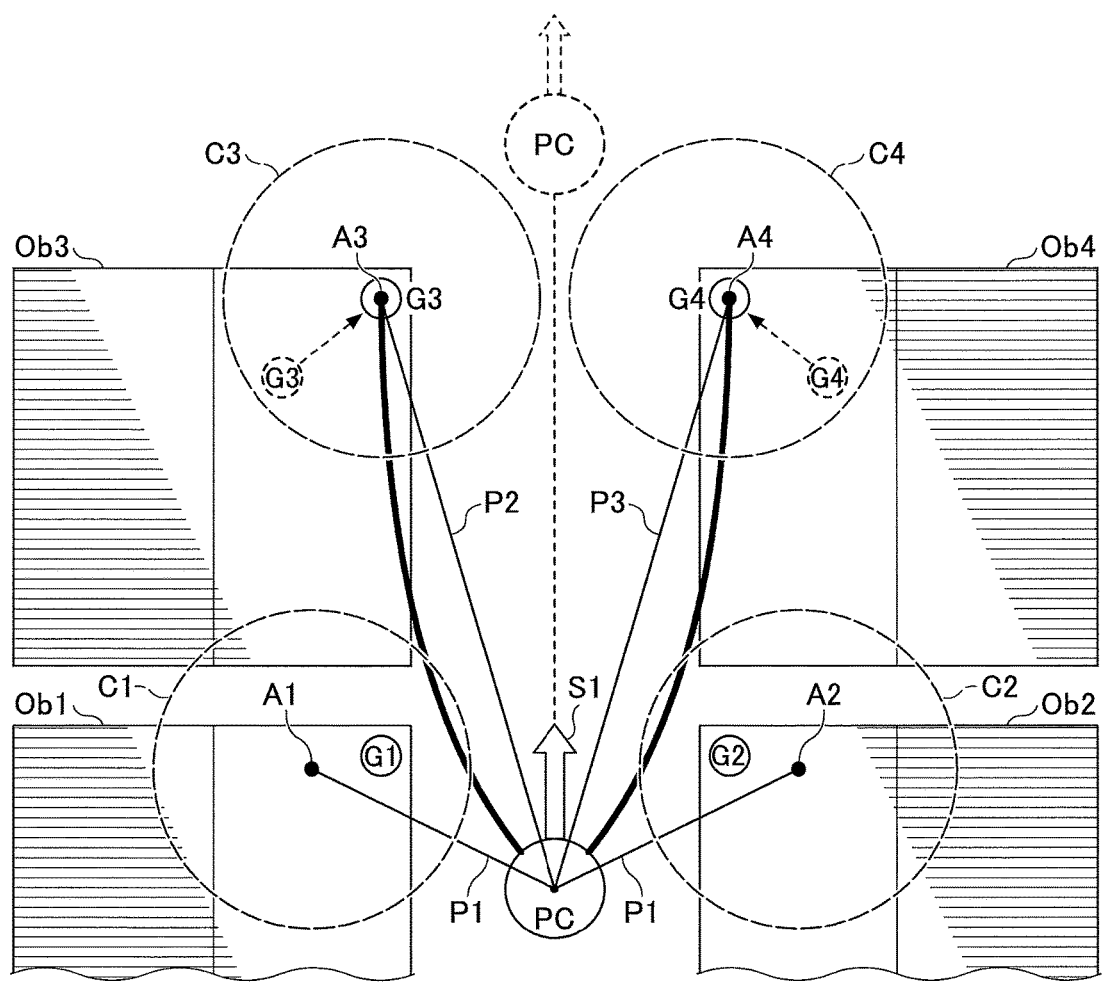
FIG. 6 is a view illustrating an example of edge detection and a target position.

FIG. 6 illustrates an example of a screen in which the player character PC is displayed. In the screen of FIG. 6, the player character PC is moving along a road between objects (buildings) Ob1 to Ob4 at both sides toward a direction illustrated as "S1". The screen of FIG. 6 illustrates a plan view of a background viewed from an upper direction in which ceiling portions of the four objects Ob1 to Ob4 and the player character PC are illustrated. Hereinafter, the objects Ob1 to Ob4 may be simply referred to as an object Ob as well. FIG. 6 illustrates an example in which the moving direction S1 of the player character PC, operated by a player, is to move from lower to upper of the drawing. At this time, the virtual bodies C1 and C2 whose centers A1 and A2 are positioned at left-hand and right-hand in front of the player character PC and apart from the center position of the player character PC for a distance P1, respectively, are placed. The distance P1 may be a fixed value, or a variable value that is varied in accordance with the moving speed of the player character PC.

The virtual bodies C1 and C2 are an example of virtual bodies for detecting positions of edges of the objects Ob1 and Ob2, respectively. The virtual bodies C1 and C2 are not actually displayed in the screen in the game. Although the virtual body is illustrated as sphere, the virtual body may have a different shape such as a capsule shape, a stick shape, a rectangular shape, a conical shape, a polygonal shape, an ellipse shape, a circular shape or the like. When the game provided by the data processing apparatus 10 of the embodiment is performed in a three dimensional virtual space, the virtual body is a three dimensional virtual object corresponding to the game. When the game provided by the data processing apparatus 10 of the embodiment is performed in a two dimensional virtual space, the virtual body is a two dimensional virtual object corresponding to the game.

Referring back to FIG. 5, next, the detection unit 12 determines a candidate target position of the virtual body in accordance with the moving speed and the operation direction of the player character PC (step S16). The detection unit 12 stores the determined candidate target position information in the candidate target position table 31 of the recording unit 13. The number of the candidate target positions is not limited to four. For example, six candidate target positions G1 to G6 (G5 and G6 are positions illustrated by dot lines, respectively) are set as the candidate target positions for the next motion of the player character PC in FIG. 8.

The target position information may be determined based on at least one of the position, the moving speed and the operation direction of the player character PC.

Next, the detection unit 12 places virtual bodies C3 and C4 in front of the virtual bodies C1 and C2 with respect to the moving direction of the player character PC (step S18). The virtual bodies C3 and C4 are an example of virtual bodies for detecting positions of edges of the objects Ob3 and Ob4, respectively. The virtual bodies C3 and C4 are not actually displayed in the screen in the game.

For example, the virtual bodies C3 and C4 whose centers A3 and A4 are at the positions of the objects Ob3 and Ob4, that are positioned at left-hand and right-hand in front of the player character PC with respect to the moving direction S1 of the player character PC, are placed in FIG. 6.

At this time, the virtual body C3 is positioned such that its center position A3 is apart from the center position of the player character PC for a distance P2. The virtual body C4 is positioned such that its center position A4 is apart from the center position of the player character PC for a distance P3. At this time, the relationship of the distances becomes P2>P1 and P3>P1, however, P2=P3 or P2≠P3.

The above relationship of the distances is satisfied when the player character PC moves in a forward direction while facing forward, in other words, when the direction of velocity is forward. On the other hand, for example, when the player character PC moves in a backward direction while facing forward, in other words, when the direction of velocity is backward, the relationship of the distances becomes P2<P1 and P3<P1.

The positions of the virtual bodies C1 to C4 may be determined in accordance with at least one of the moving speed, the operation direction and the position of the player character PC.

The size of the virtual body C is set at an optimal value based on the size of the object Ob of the background such as the building, the road or the like. If the size of the virtual body C is too small, the possibility that the position of the edge of the building or the like is not included in the virtual body C becomes high and the detection of the edge may be difficult. For the example of FIG. 6, it is preferable that the diameter of each of the virtual bodies C1 to C4 is at least greater than the width of the road on which the player character PC moves.

Referring back to FIG. 5, the detection unit 12 determines whether the virtual bodies C1 to C4 collide with the objects Ob1 to Ob4, respectively (step S20).

Figure 7:
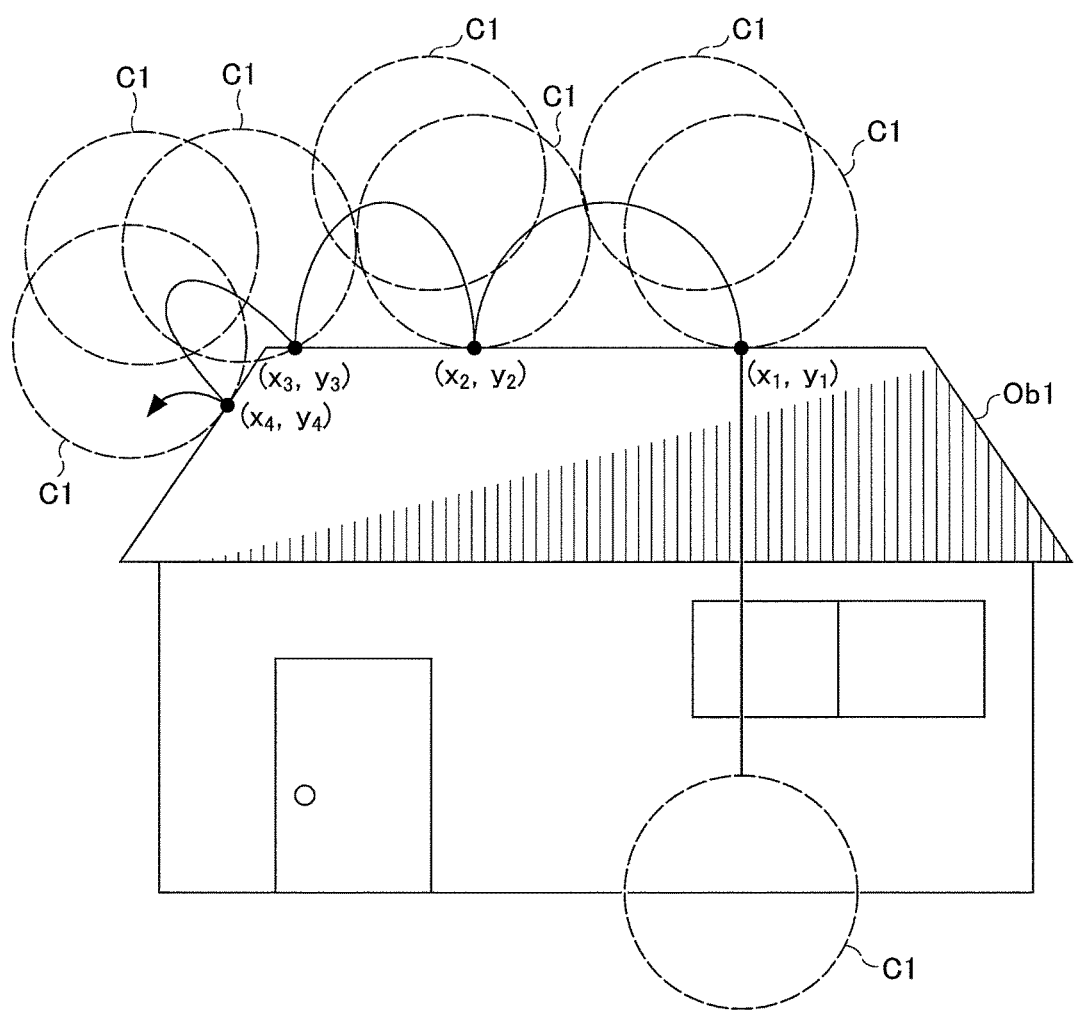
FIG. 7 is a view illustrating an example of a collision position.

FIG. 7 illustrates another example of the virtual body C1 and the object Ob1 in which the object Ob1 is a building including a roof. In the example of the screen illustrated in FIG. 7, first, the virtual body C1 collides with a side surface of the object Ob1. Then, the virtual body C1 is bounded toward a ceiling direction of the object Ob1. The detection unit 12 detects the collision positions of the virtual body C1, which is bounded above the roof of the object Ob1, and the roof of the object Ob1. Here, directions of bounding may be changed for the case when the virtual body C1 contacts an upper surface of the object Ob and the case when the virtual body C1 contacts a side surface (wall). With this, accuracy of the edge detection can be increased.

Similarly, in this embodiment, when each of the virtual bodies C1 to C4 collides with either of the objects Ob of the background, each of the virtual bodies C1 to C4 may be bounded upward, and may be positioned at an upper portion of the respective object Ob of the background.

When the detection unit 12 determines that the virtual bodies C1 to C4 do not collide with the object Ob (NO of step S20), the process is finished. On the other hand, when the detection unit 12 determines that at least one of the virtual bodies C1 to C4 collides with the object Ob (YES of step S20), the detection unit 12 compares the coordinate of the collision position and the coordinate of the candidate target position indicated by the candidate target position information 312 (see FIG. 3) stored at the time, and determines whether the collision position is more appropriate than the current candidate target position for the motion of the player character PC (step S22).

When the detection unit 12 determines that the collision position is more appropriate than the current candidate target position for the motion of the PC (YES of step S22), the detection unit 12 update the candidate target position information 312 of the candidate target position table 31 of the recording unit 13 by the coordinate of the collision position (step S24), and the process is finished. The detection unit 12 may store the coordinate of the collision position as the contact position information 302 of the contact position table 30 of the recording unit 13.

Whether the collision position is more appropriate than the current candidate target position for the motion of the player character PC may be determined based on which of the collision position and the current candidate target position is closer to the position of the edge of the object Ob. At this time, the position of the edge may be a side portion of the object or a corner portion of the object. In this embodiment, four corner portions and their vicinities of each of the objects Ob1 to Ob4 illustrated in FIG. 6 are set as the edge of the respective object Ob.

As illustrated in FIG. 5, the detection unit 12 may perform the collision detection of step S20 once for 1 frame, or may perform the collision detection of step S20 for a plurality of times for 1 frame. With this, as illustrated in FIG. 7 as the collision positions of the virtual body C1, for example, the coordinates at each of which the virtual body collides with the object are stored in the contact position information 302, and the coordinate of the collision position is substituted for the candidate target position information 312 when the respective collision position is more appropriate than the current candidate target position for the motion of the player character PC.

According to the edge detection process of the embodiment, by causing the four virtual bodies C1 to C4 to bound in the background, the collision with the object Ob is generated. The four virtual bodies C1 to C4 are set at positions corresponding to at least one of the position, the operation direction and the moving speed of the player character PC, then, the virtual bodies C1 to C4 collide with the object Ob while bounding in the vicinity.

With this, the collision position (contact position information) of the virtual body C and the object Ob obtained in real time during the game in accordance with a motion status of the player character PC can be detected, and the edge position of the object Ob can be obtained based on the collision position. As a result, in this embodiment, it is unnecessary to previously store the position information for each of the objects Ob of the background.

In step S18 of FIG. 5, when placing the virtual bodies C3 and C4, the detection unit 12 may place the virtual bodies C3 and C4 based on at least one of the position, the operation direction and the moving speed of the player character PC.

Figure 8:
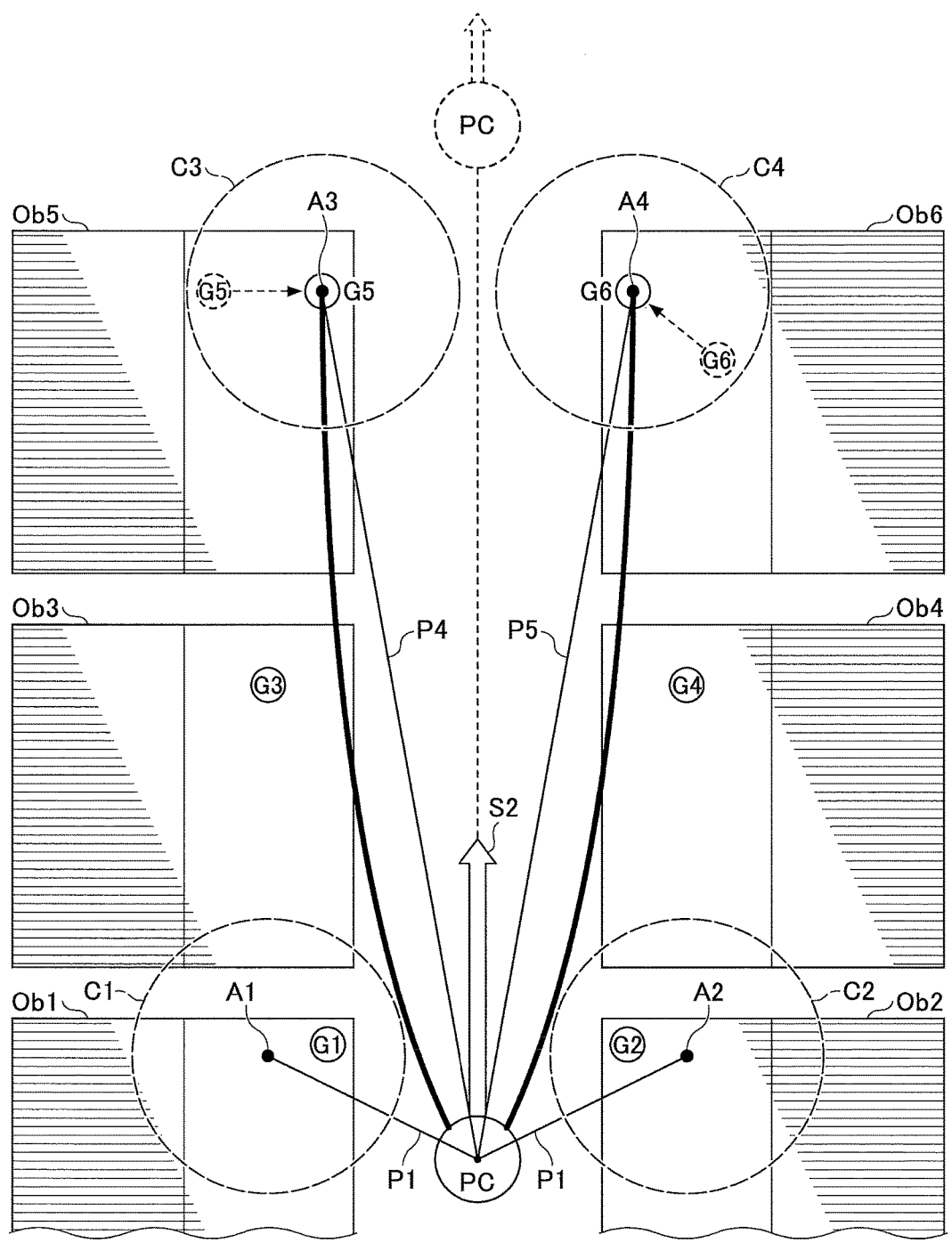
FIG. 8 is a view illustrating another example of the edge detection and the target position.

Specifically, with reference to FIG. 6 and FIG. 8, an example is described in which the placement of the virtual body C is controlled in accordance with the moving speed of the player character PC. It is assumed that for the player characters PC in the examples illustrated in FIG. 6 and FIG. 8, the operation directions S1 and S2 are the same but the moving speeds are different. The difference between the moving speeds is illustrated by the lengths of arrows of the operation directions S1 and S2. The moving speed of the player character PC in FIG. 8 is faster than the moving speed of the player character PC in FIG. 6. The positions of the virtual bodies C1 and C2 are the same in FIG. 6 and FIG. 8.

In such a case, the detection unit 12 places the virtual bodies C3 and C4 to be further from the virtual bodies C1 and C2 in FIG. 8 than the virtual bodies C3 and C4 with respect to the virtual bodies C1 and C2 in FIG. 6. As a result, the virtual bodies C3 and C4 whose centers A3 and A4 are at the positions of the objects Ob5 and Ob6, that are positioned at left-hand and right-hand in front of the player character PC, are placed.

At this time, the virtual body C3 is positioned such that its center position A3 is apart from the center position of the player character PC for a distance P4. The virtual body C4 is positioned such that its center position A4 is apart from the center position of the player character PC for a distance P5. At this time, the relationship of the distances becomes P4>P1 and P5>P1, however, P4=P5 or P4≠P5. With this, the coordinates of the four virtual bodies C1 to C4 in the virtual space are determined.

The above relationship of the distances is satisfied when the player character PC moves in a forward direction while facing forward, in other words, when the direction of velocity is forward. On the other hand, for example, when the player character PC moves in a backward direction while facing forward, in other words, when the direction of velocity is backward, the relationship of the distances becomes P4<P1 and P5<P1.

For the examples illustrated in FIG. 6 and FIG. 8, the operation directions S1 and S2 of the player character PC are the same. On the other hand, when the operation directions S1 and S2 of the player character PC are different, the virtual bodies C3 and C4 are placed at positions tilted from the moving direction of the player character PC in accordance with the operation directions S1 and S2 of the player character PC, respectively.

For example, when the operation direction of the player character PC is an obliquely right upward, the virtual bodies C3 and C4 are placed furthermore rightward than the virtual bodies C3 and C4 illustrated in FIG. 6 and FIG. 8.

(Target Position Determining Process)

Figure 9:
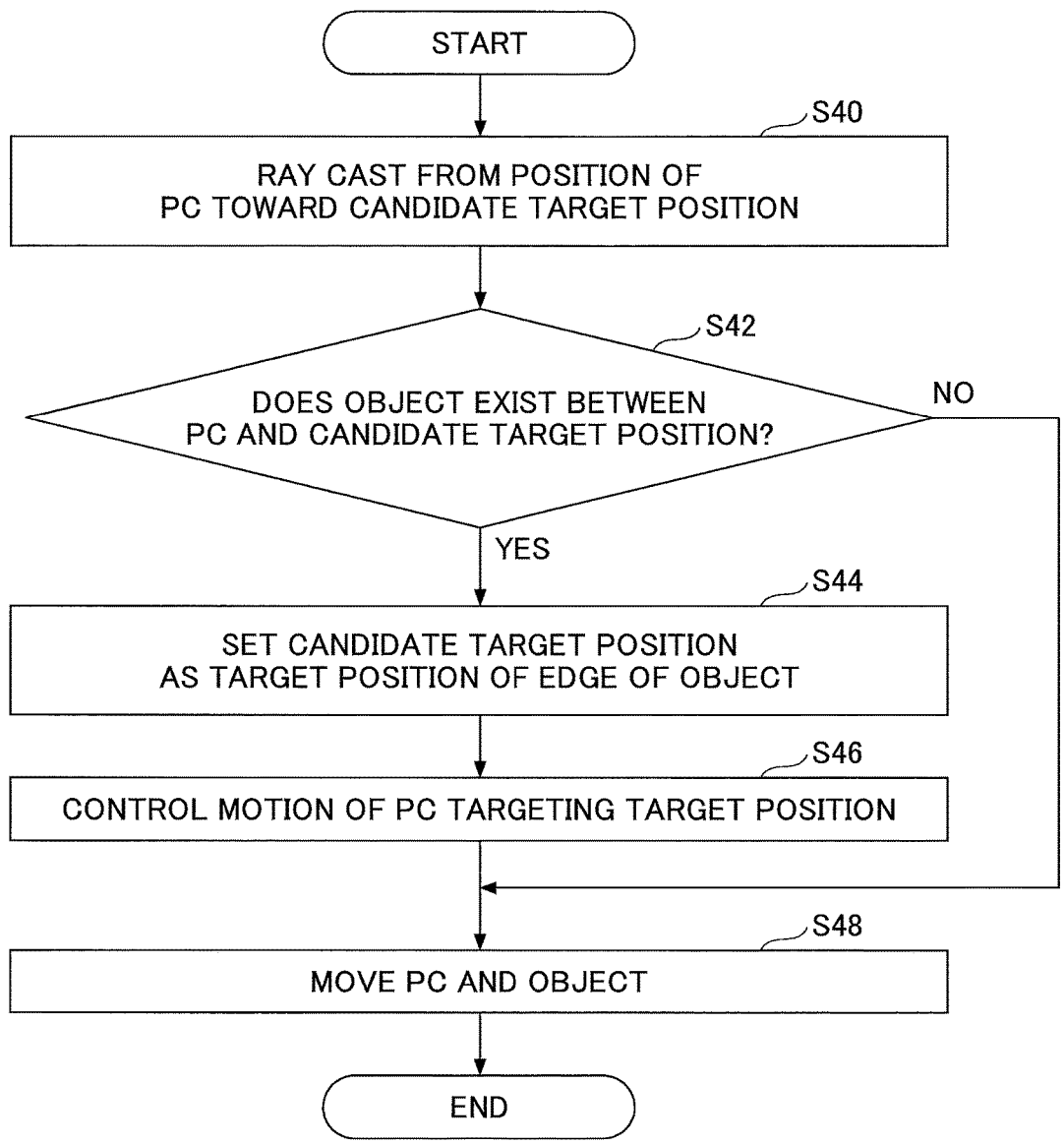
FIG. 9 is a flowchart illustrating an example of a target position determining process.

Next, an example of a target position determining process of the embodiment is described with reference to FIG. 9. FIG. 9 is a flowchart illustrating an example of the target position determining process of the embodiment. The target position determining process of the embodiment is performed in accordance with the motion of the player character PC that targets the target position in the progression of the game.

When the process is started, the specifying unit 14 ray casts from the position of the player character PC toward the candidate target position stored in the candidate target position table 31 (step S40).

Next, the specifying unit 14 determines whether an object exists between the position of the player character PC and the candidate target position (step S42). When the specifying unit 14 determines that the object does not exist between the position of the player character PC and the candidate target position (NO of step S42), the process is finished.

On the other hand, when the specifying unit 14 determines that the object exists between the position of the player character PC and the candidate target position (YES of step S42), the specifying unit 14 recognizes the edge of the object as the candidate target position, and uses the newly recognized candidate target position as the target position of the edge of the object (step S44).

Here, it is assumed that the coordinate $(x_{g3}, y_{g3})$ of the candidate target position information 312 of the candidate target number 311 "G3" in FIG. 3 is substituted by the coordinate $(x_{14}, y_{14})$ of the edge position information 303 of the virtual body number 301 "C3" in FIG. 2 by the processes illustrated in FIG. 5 and FIG. 9. Further, it is assumed that the coordinate $(x_{g4}, y_{g4})$ of the candidate target position information 312 of the candidate target number 311 "G4" in FIG. 3 is substituted by the coordinate $(x_{20}, y_{20})$ of the edge position information 303 of the virtual body number 301 "C4" in FIG. 2 by those processes.

As a result, for example, the candidate target position of the candidate target number "G3" is moved from the previously set position (illustrated by a dot line) to the edge position A3 detected by causing the virtual body C3 to be bounded in FIG. 6, and the candidate target position is optimized. Similarly, the candidate target position of the candidate target number "G4" is moved to the edge position A4 detected by causing the virtual body C4 to be bounded, and the candidate target position can be optimized. At this time, the candidate target positions of the candidate target numbers G1 and G2, respectively, are not moved.

Similarly, for example, the candidate target position of the candidate target number "G5" (illustrated by a dot line) is moved to the edge position A3 detected by the virtual body C3 in FIG. 8. Similarly, the candidate target position of the candidate target number "G6" (illustrated by a dot line) is moved to the edge position A4 detected by the virtual body C4. The candidate target positions of the candidate target numbers G1 to G4, respectively, do not move. The candidate target positions G3 and G4 in FIG. 8 may be omitted from targets for the process of comparing with the edge positions.

Further, the candidate target positions G3 and G4 themselves may be omitted from the candidate target positions in FIG. 8.

Next, the motion control unit 15 controls the movement of the player character PC which targets the target position (step S46). Thereafter, the player character PC and the object are cooperatively moved (step S48), and the process is finished. As such, in this embodiment, the movement of the character can be controlled by cooperatively operating the character and the object that exists at the target position in accordance with a single input operation.

For example, the motion control unit 15 may control the movement of the player character PC such that laser light is emitted from a weapon possessed by the player character PC toward the target position in accordance with the input operation of the player. Further, the motion control unit 15 may control the movement of the player character PC such that the player character PC releases a bullet from a gun, releases a sword or an arrow, hits by a fist or the like, toward the target position.

Furthermore, for example, the motion control unit 15 may control the next movement of the player character PC, in accordance with the input operation of the player, such that a wire possessed by the player character PC is injected toward the target position and fixed at the target position.

For example, the motion control unit 15 may control the movement of the player character PC, in accordance with the input operation of the player, such that the player character PC is moved by a pendulum movement by two wires fixed at the two objects (target positions), respectively. The wires extending toward the target positions may be displayed as a linear line, or a wavy line having predetermined amplitude.

By the above processes, in this embodiment, the movement of the player character PC can be controlled by cooperatively operating the object Ob which exists between the player character PC and the target position by a single button operation by the player to the target position defined by the determined target position information.

For example, in FIG. 6 and FIG. 8, wires, among weapons possessed by the player character PC, can be injected toward the candidate target positions G3 and G4 (toward the candidate target positions G5 and G6 in FIG. 8) to be fixed at the objects Ob when the player only performs a single button operation to use the weapon possessed by the player character PC. With this, by controlling the player character PC to perform a pendulum movement while being connected to the objects Ob3 and Ob4 (or G5 and G6), a springy movement of the player character PC with a floating feeling can be displayed.

Figure 10:
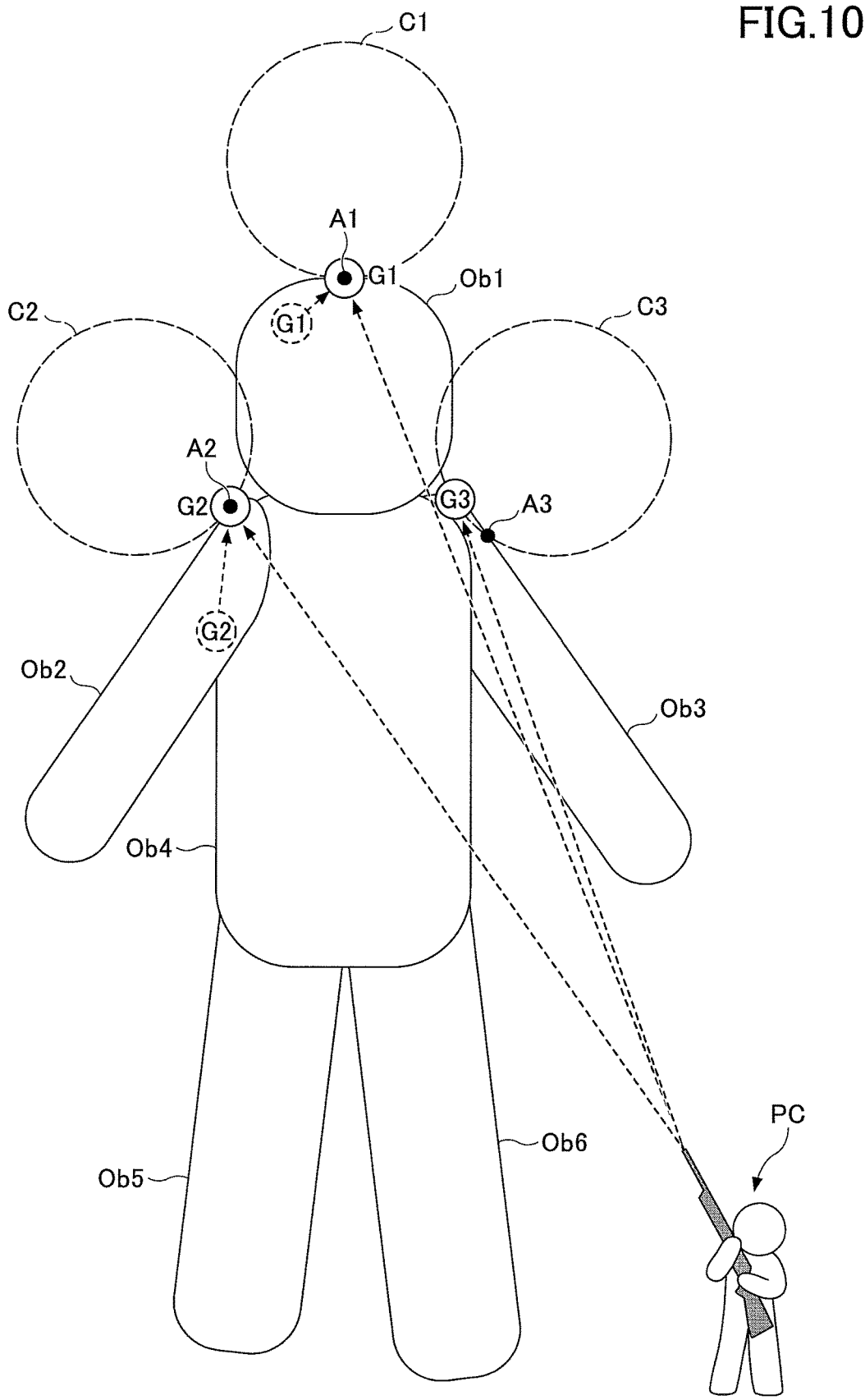
FIG. 10 is a view illustrating another example of the edge detection and the target position.

FIG. 10 is a view illustrating another example of the edge detection and the target position. For the example illustrated in FIG. 10, the player performs a button operation to use a weapon possessed by the player character PC toward the objects Ob1 to Ob6 as targets. With this, a net or a bullet that is injected from the weapon possessed by the player character PC can hit the candidate target positions G1 to G3. With this, it is possible to control the player character PC to perform a next movement while linking the player character PC with the objects Ob1 to Ob3.

In this embodiment, the edge position can be detected by the virtual body whose position moves in accordance with the movement of the object Ob. With this, an optimal target position can be selected from the detected edge positions. In particular, in this embodiment, as illustrated in FIG. 10, an optimal target position can be selected from the detected edge positions for the moving object Ob. As a result, the movement of the player character PC while the player character PC is pulled toward the object Ob can be appropriately controlled.

Figure 11:
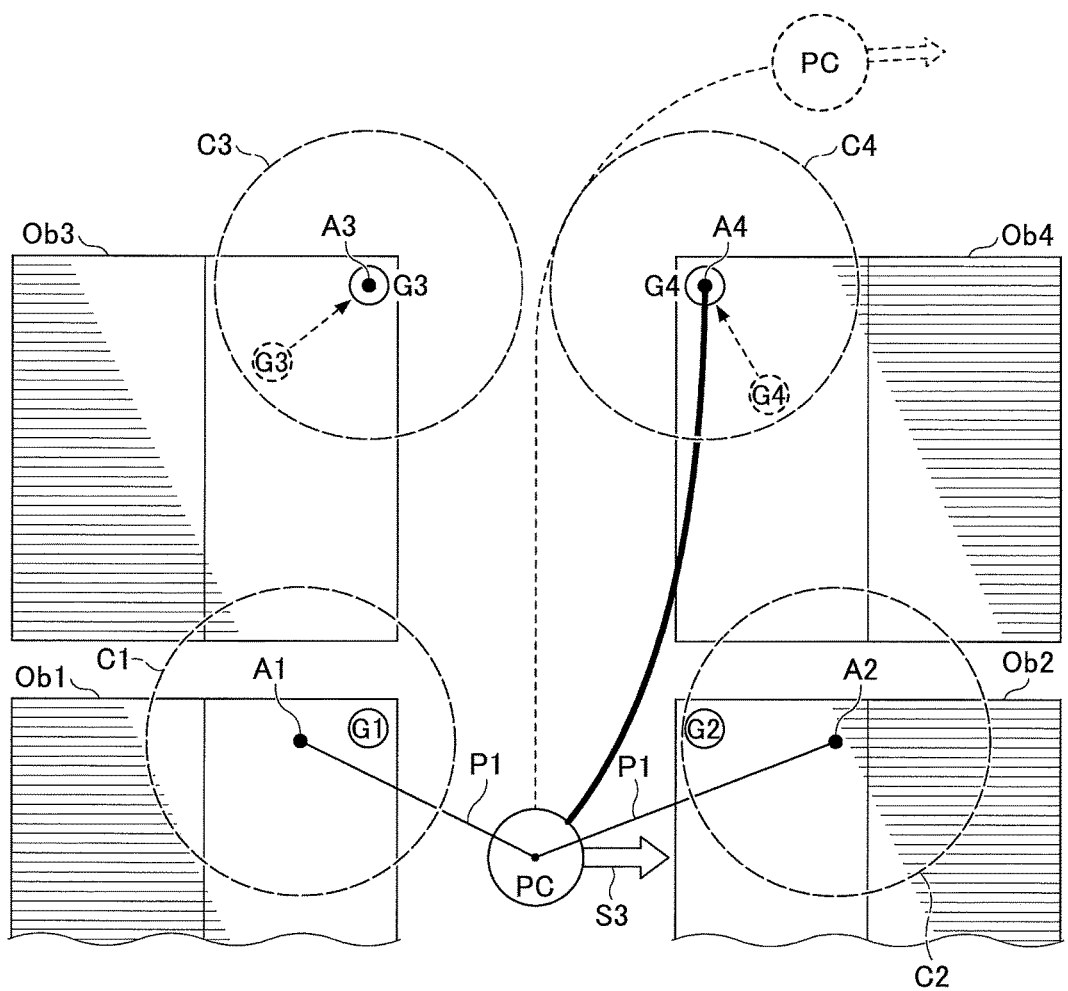
FIG. 11 is a view illustrating another example of the edge detection and the target position.

In FIG. 5, the candidate target position is determined based on at least one of the position, the moving speed and the operation direction of the player character PC. As a result, in FIG. 6, the candidate target positions G3 and G4 are selected as the target positions in accordance with the operation direction S1 and the moving speed of the player character PC. Further, in FIG. 8, the candidate target positions G5 and G6 are selected as the target positions in accordance with the operation direction S2 and the moving speed of the player character PC. As another example, as illustrated in FIG. 11, the candidate target position G4 may be selected as a target position in accordance with the operation direction S3 and the moving speed of the player character PC. In such a case, the motion control unit 15 can display a springy movement of the player character PC with a floating feeling by controlling the player character PC to perform a pendulum movement by the wire fixed to the object Ob4.

As described above, according to the data processing apparatus 10 of the embodiment, collision between the virtual body C and the object Ob is generated by causing the virtual body C to be bounded. With this, edge positions of the object can be obtained in accordance with a motion status of the player character PC in real time during the game. The motion status of the player character PC may include the position of the player character PC, the operation direction of the player character PC and the moving speed of the player character PC in accordance with the input operation. The appropriate edge of the object is automatically detected during the game in accordance with at least one of them. Then, the player character in the virtual space can be appropriately moved based on the edge position as the target position. In particular, even when the object Ob dynamically moves, the player character PC can be appropriately operated in accordance with the position of the object Ob.

When the target position is determined, the virtual body C is moved to a next predetermined position for detecting a next edge position.

Further, there may be a case that a position appropriate for a target position does not exist in a background, for example, when the background is prairie or the like. In such a case, the candidate target position information 312 stored in the candidate target position table 31 of FIG. 3 are cleared. However, for a case that the background is changed from the prairie or the like to a background including a certain number of buildings or the like when the player character PC changes the moving direction for 180°, the specifying unit 14 sets coordinates of candidate target positions again, and stores the coordinates as the candidate target position 312 in the candidate target position table 31 of FIG. 3. Then, the detection of the edge position of the embodiment is performed again.

According to the embodiment, it is possible to control a character to appropriately move in a virtual space.

Although a preferred embodiment of the data processing apparatus and the method of detecting position information has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, the edge position information of the object is selected from the plurality of contact position information at each of which the virtual body contacts the object at the upper portion of the object when the virtual body is bounded. However, alternatively, the edge position information of the object may be selected from a plurality of contact position information at which the virtual body contacts the object at a side portion or a bottom portion of the object when the virtual body is bounded. Further, the edge position information of the object may be selected from the contact position information at which the virtual body contacts the object and which is a characteristic portion of the object such as a projection portion, a corner portion, a concave portion or the like.

Further, the data processing apparatus 10 and the display 29 may be separately structured. For example, the data processing apparatus 10 may be connected to a TV device or the like, and a display of the TV device or the like may be used as the display 29.

What is claimed is:

1. A data processing apparatus comprising:
   a processor; and
   a memory storing instructions that, when executed, cause the processor to perform processes of
      displaying a character operated by an input operation of a player and a background in a virtual space on a screen, the background including an object,
      obtaining at least one of a position of the character, a moving speed of the character and an operation direction of the character in the virtual space based on the input operation,
      providing a virtual body for specifying characteristic position information regarding a shape of the object of the background in the virtual space based on the obtained at least one of the position of the character, the moving speed of the character and the operation direction of the character, the characteristic position information being an edge position of the object of the background, the virtual body not being displayed on the screen, the virtual body being provided such that the center of the virtual body is apart from the center position of the player by a predetermined distance,
      moving the virtual body to perform a predetermined motion to contact the object of the background and detecting contact position information at which the virtual body contacts the object of the background in the virtual space, and
      specifying characteristic position information regarding a shape of the object of the background based on the detected contact position information, the shape of the object of the background not being changed by the contact with the virtual body,
   wherein a size of the virtual body is determined based on a size of the object of the background.

2. The data processing apparatus according to claim 1,
   wherein the background includes a plurality of objects,
   wherein in the providing, a plurality of the virtual bodies are provided in the virtual space based on the obtained at least one of the position of the character, the moving speed of the character and the operation direction of the character, and
   wherein in the moving, each of the plurality of the virtual bodies is moved to perform the predetermined motion in the virtual space to detect the contact position information at which the plurality of the virtual bodies contact the plurality of the objects, respectively.

3. The data processing apparatus according to claim 1,
   wherein the instructions stored in the memory, when executed, cause the processor to further perform processes of
      setting the edge position of the object of the background as a target position of a next motion of the character based on the characteristic position information specified in the specifying, and
      controlling a motion of the character that targets the target position.

4. The data processing apparatus according to claim 3,
   wherein in the controlling, the motion of the character is controlled by a pendulum movement by targeting the target position.

5. The data processing apparatus according to claim 4,
   wherein in the controlling, the movement of the character is controlled by cooperatively operating the character and the object which exists at the target position in accordance with a single input operation to the determined target position.

6. The data processing apparatus according to claim 1,
   wherein the object of the background is not operated by an input operation of the player.

7. The data processing apparatus according to claim 1,
   wherein in the moving, the predetermined motion is to bound the virtual body to contact a plurality of positions of the object of the background, and
   wherein in the specifying, an edge position of the object of the background is specified based on the plurality of positions at each of which the virtual body contacts the object of the background.

8. The data processing apparatus according to claim 1,
   wherein the instructions stored in the memory, when executed, cause the processor to further perform processes of
      determining a candidate target position of a next motion of the character based on the obtained at least one of the position of the character, the moving speed of the character and the operation direction of the character,
      ray casting from the position of the character toward the candidate target position to determine whether the object of the background exists between the position of the character and the candidate target position,
      when it is determined that the object of the background exists between the position of the character and the candidate target position, setting the edge position of the object of the background as a new candidate target position of the next motion of the character, while when it is determined that the object of the background does not exist between the position of the character and the candidate target position, retaining the candidate target position, and
      selecting the candidate target position as a target position of the next motion of the character and controlling the movement of the character to target the target position.

9. A method of detecting position information, performed by a computer, comprising:
   displaying a character operated by an input operation of a player and a background in a virtual space on a screen, the background including an object;
   obtaining at least one of a position of the character, a moving speed of the character and an operation direction of the character in the virtual space based on the input operation;

providing a virtual body for specifying characteristic position information regarding a shape of the object of the background in the virtual space based on the obtained at least one of the position of the character, the moving speed of the character and the operation direction of the character, the characteristic position information being an edge position of the object of the background, the virtual body not being displayed on the screen, the virtual body being provided such that the center of the virtual body is apart from the center position of the player by a predetermined distance;

moving the virtual body to perform a predetermined motion to contact the object of the background and detecting contact position information at which the virtual body contacts the object of the background in the virtual space; and specifying characteristic position information regarding a shape of the object of the background based on the detected contact position information, the shape of the object of the background not being changed by the contact with the virtual body, wherein a size of the virtual body is determined based on a size of the object of the background.

10. The method of detecting position information according to claim 9, wherein the object of the background is not operated by an input operation of the player.

11. The method of detecting position information according to claim 9, wherein in the moving, the predetermined motion is to bound the virtual body to contact a plurality of positions of the object of the background, and wherein in the specifying, an edge position of the object of the background is specified based on the plurality of positions at each of which the virtual body contacts the object of the background.

12. The method of detecting position information according to claim 9, further comprising:

determining a candidate target position of a next motion of the character based on the obtained at least one of the position of the character, the moving speed of the character and the operation direction of the character;

ray casting from the position of the character toward the candidate target position to determine whether the object of the background exists between the position of the character and the candidate target position;

when it is determined that the object of the background exists between the position of the character and the candidate target position, setting the edge position of the object of the background as a new candidate target position of the next motion of the character, while when it is determined that the object of the background does not exist between the position of the character and the candidate target position, retaining the candidate target position; and selecting the candidate target position as a target position of the next motion of the character and controlling the movement of the character to target the target position.

13. A non-transitory computer-readable recording medium having recorded thereon a program that causes a computer to execute a method of detecting position information, the method comprising:

displaying a character operated by an input operation of a player and a background in a virtual space on a screen, the background including an object;

obtaining at least one of a position of the character, a moving speed of the character and an operation direction of the character in the virtual space based on the input operation;

providing a virtual body for specifying characteristic position information regarding a shape of the object of the background in the virtual space based on the obtained at least one of the position of the character, the moving speed of the character and the operation direction of the character, the characteristic position information being an edge position of the object of the background, the virtual body not being displayed on the screen, the virtual body being provided such that the center of the virtual body is apart from the center position of the player by a predetermined distance;

moving the virtual body to perform a predetermined motion to contact the object of the background and detecting contact position information at which the virtual body contacts the object of the background in the virtual space; and specifying characteristic position information regarding a shape of the object of the background based on the detected contact position information, the shape of the object of the background not being changed by the contact with the virtual body, wherein a size of the virtual body is determined based on a size of the object of the background.

14. The non-transitory computer-readable recording medium according to claim 13, wherein the object of the background is not operated by an input operation of the player.

15. The non-transitory computer-readable recording medium according to claim 13, wherein in the moving, the predetermined motion is to bound the virtual body to contact a plurality of positions of the object of the background, and wherein in the specifying, an edge position of the object of the background is specified based on the plurality of positions at each of which the virtual body contacts the object of the background.

16. The non-transitory computer-readable recording medium according to claim 13, wherein the method of detecting position information further comprises determining a candidate target position of a next motion of the character based on the obtained at least one of the position of the character, the moving speed of the character and the operation direction of the character, ray casting from the position of the character toward the candidate target position to determine whether the object of the background exists between the position of the character and the candidate target position, when it is determined that the object of the background exists between the position of the character and the candidate target position, setting the edge position of the object of the background as a new candidate target position of the next motion of the character, while when it is determined that the object of the background does not exist between the position of the character and the candidate target position, retaining the candidate target position, and selecting the candidate target position as a target position of the next motion of the character and controlling the movement of the character to target the target position.

* * * * *